United States Patent
Bisht

(10) Patent No.: US 9,436,934 B2
(45) Date of Patent: Sep. 6, 2016

(54) TECHNIQUES FOR VISUAL INTEGRATION OF MEETING SPACE IN CALENDAR SYSTEMS

(71) Applicant: Novell, Inc., Provo, UT (US)

(72) Inventor: Jitender Bisht, Bangalore (IN)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 14/448,562

(22) Filed: Jul. 31, 2014

(65) Prior Publication Data
US 2014/0343978 A1 Nov. 20, 2014

Related U.S. Application Data

(62) Division of application No. 12/271,176, filed on Nov. 14, 2008, now Pat. No. 8,799,048.

(51) Int. Cl.
| | | |
|---|---|---|
| G06Q 10/00 | (2012.01) | |
| G06Q 10/10 | (2012.01) | |
| H04W 4/04 | (2009.01) | |
| G06Q 10/02 | (2012.01) | |
| H04W 4/00 | (2009.01) | |
| H04W 4/02 | (2009.01) | |

(52) U.S. Cl.
CPC .......... G06Q 10/1095 (2013.01); G06Q 10/02 (2013.01); G06Q 10/109 (2013.01); H04W 4/043 (2013.01); G06Q 10/1093 (2013.01); H04W 4/003 (2013.01); H04W 4/021 (2013.01)

(58) Field of Classification Search
None
See application file for complete search history.

(56) References Cited

U.S. PATENT DOCUMENTS

| | | | | |
|---|---|---|---|---|
| 4,857,840 | A * | 8/1989 | Lanchais | 324/207.26 |
| 5,124,912 | A * | 6/1992 | Hotaling et al. | 705/7.19 |
| 5,948,040 | A * | 9/1999 | DeLorme et al. | 701/426 |
| 6,480,830 | B1 * | 11/2002 | Ford et al. | 705/7.19 |
| 7,027,995 | B2 * | 4/2006 | Kaufman et al. | 705/7.12 |
| 7,036,128 | B1 * | 4/2006 | Julia et al. | 719/317 |
| 7,231,423 | B1 * | 6/2007 | Horstmann et al. | 709/204 |
| 7,446,766 | B2 * | 11/2008 | Moravec | 345/424 |
| 7,707,256 | B2 * | 4/2010 | Rollin et al. | 709/206 |
| 7,720,893 | B2 * | 5/2010 | Boudreau et al. | 709/217 |
| 7,913,179 | B2 * | 3/2011 | Sheha et al. | 715/769 |
| 8,799,048 | B2 | 8/2014 | Bisht | |
| 2002/0184063 | A1 * | 12/2002 | Kaufman et al. | 705/7 |
| 2003/0191772 | A1 * | 10/2003 | Schaumann et al. | 707/102 |
| 2003/0217073 | A1 * | 11/2003 | Walther et al. | 707/104.1 |
| 2003/0229441 | A1 * | 12/2003 | Pechatnikov et al. | 701/201 |
| 2004/0054428 | A1 * | 3/2004 | Sheha et al. | 700/56 |
| 2004/0153334 | A1 * | 8/2004 | Dione | 705/1 |
| 2004/0172277 | A1 * | 9/2004 | Dione | 705/1 |

(Continued)

OTHER PUBLICATIONS

Ashbrook, Daniel, and Thad Starner. "Using GPS to learn significant locations and predict movement across multiple users." Personal and Ubiquitous Computing 7.5 (2003): 275-286.*

(Continued)

Primary Examiner — Gurkanwaljit Singh
(74) Attorney, Agent, or Firm — Schwegman Lundberg & Woessner, P.A.

(57) ABSTRACT

Techniques for visual integration of meeting spaces within a calendar system are presented. A meeting room can be viewed via a map and selected for scheduling a meeting. The map depicts the location of the meeting room within a facility of an enterprise. A meeting scheduler visually sees the meeting room within the map and can select the meeting room and acquire details about the meeting room.

17 Claims, 3 Drawing Sheets

(56) References Cited

U.S. PATENT DOCUMENTS

| | | | |
|---|---|---|---|
| 2005/0149561 A1* | 7/2005 | Hodnett et al. | 707/104.1 |
| 2005/0190053 A1* | 9/2005 | Dione | 340/500 |
| 2005/0222890 A1* | 10/2005 | Cheng et al. | 705/9 |
| 2005/0227712 A1* | 10/2005 | Estevez et al. | 455/456.3 |
| 2005/0273372 A1* | 12/2005 | Bowne et al. | 705/5 |
| 2005/0289524 A1* | 12/2005 | McGinnes | 717/140 |
| 2006/0048066 A1* | 3/2006 | O'Rourke | 715/764 |
| 2006/0149778 A1 | 7/2006 | Clover | |
| 2006/0288010 A1* | 12/2006 | Chen et al. | 707/9 |
| 2007/0136218 A1* | 6/2007 | Bauer et al. | 706/12 |
| 2007/0139191 A1* | 6/2007 | Quatro | 340/539.13 |
| 2007/0149214 A1* | 6/2007 | Walsh et al. | 455/456.1 |
| 2007/0197229 A1* | 8/2007 | Kalliola et al. | 455/456.1 |
| 2007/0233695 A1* | 10/2007 | Boudreau et al. | 707/10 |
| 2007/0264968 A1* | 11/2007 | Frank et al. | 455/404.2 |
| 2008/0036778 A1* | 2/2008 | Sheha et al. | 345/502 |
| 2008/0046170 A1* | 2/2008 | DeGrazia | 701/202 |
| 2008/0109718 A1 | 5/2008 | Narayanaswami | |
| 2008/0114840 A1* | 5/2008 | Rollin et al. | 709/206 |
| 2008/0133524 A1 | 6/2008 | Ryan et al. | |
| 2008/0147472 A1* | 6/2008 | Hitz | 705/9 |
| 2008/0183483 A1* | 7/2008 | Hart | 705/1 |
| 2008/0189197 A1 | 8/2008 | Allanson et al. | |
| 2008/0195608 A1 | 8/2008 | Clover | |
| 2009/0006994 A1* | 1/2009 | Forstall et al. | 715/764 |
| 2009/0024442 A1* | 1/2009 | Brink et al. | 705/9 |
| 2009/0055234 A1* | 2/2009 | Li et al. | 705/8 |
| 2009/0125367 A1* | 5/2009 | Brink et al. | 705/9 |
| 2009/0144143 A1* | 6/2009 | Iyer | 705/14 |
| 2009/0194137 A1* | 8/2009 | Friedman et al. | 134/18 |
| 2009/0307043 A1* | 12/2009 | Cholewinski | 705/9 |
| 2009/0327227 A1* | 12/2009 | Chakra et al. | 707/3 |
| 2010/0082239 A1* | 4/2010 | Hardy et al. | 701/208 |
| 2010/0125478 A1 | 5/2010 | Bisht | |

OTHER PUBLICATIONS

Ashbrook, Daniel, and Thad Starner. "Learning significant locations and predicting user movement with GPS." Wearable Computers, 2002.(ISWC 2002). Proceedings. Sixth International Symposium on. IEEE, 2002.*

Kincaid, Christine M., Pierre B. Dupont, and A. Roger Kaye. "Electronic calendars in the office: an assessment of user needs and current technology."ACM Transactions on Information Systems (TOIS) 3.1 (1985): 89-102.*

Tullio, Joe, et al. "Augmenting shared personal calendars." UIST. vol. 2. 2002.*

Kjeldskov, Jesper, et al. "Designing TramMatena context-aware mobile system supporting use of public transportation." Proceedings of the 2003 conference on Designing for user experiences. ACM, 2003.*

Knoblock, Craig A., et al. "Mixed-initiative, multi-source information assistants."Proceedings of the 10th international conference on World Wide Web. ACM, 2001.*

Ashbrook, Daniel, et al., "Learning significant locations and predicting user movement with GPS", Wearable Computers, Proceedings. Sixth International Symposium on. IEEE, (2002).

Ashbrook, Daniel, et al., "Using GPS to learn significant locations and predict movement across multiple users", Personal and Ubiquitous Computing 7.5, (2003), 275-286.

Kincaid, Christine M, et al., "Electronic calendars in the office: an assessment of user needs and current technology", ACM Transactions on Information Systems, (1985), 89-102.

Kjeldskov, Jesper, et al., "Designing TramMatena context-aware mobile system supporting use of public transportation", Proceedings of the 2003 conference on Designing for user experiences, (2003).

Knoblock, Craig A, et al., "Mixed-initiative, multi-source information assistants", Proceedings of the 10th international conference on World Wide Web, (2001).

Tullio, Joe, et al., "Augmenting shared personal calendars", UIST. vol. 2, (2002).

* cited by examiner ical or image presentation of an
TECHNIQUES FOR VISUAL INTEGRATION OF MEETING SPACE IN CALENDAR SYSTEMS This application is a divisional of U.S. patent application Ser. No. 12/271,176, filed Nov. 14, 2008, now issued as U.S. Pat. No. 8,799,048, which is incorporated herein by reference in its entirety.

BACKGROUND

Scheduling meetings via email clients is not intuitive or easy for email users. Typically, when an email client sends an appointment for a meeting, the user needs to know the meeting room name to search for it. Moreover, the meeting room name may not be labeled within the email system with a nomenclature that the user is aware of. That is, the meeting room may be labeled within the email system with a name that is different from how the employees of an enterprise refer to it as.

Further, even if the user knows the name of the meeting room, the user may not be aware of its location within the enterprise. Many modern enterprises span multiple buildings and multiple geographic locations. So, not being able to rapidly know the location of a meeting room can be a considerable amount of consternation for employees. Generally what happens in these situations is that an employee that desires to know the location of a meeting room locates the organizer's name in the employee directory and either calls the organizer or an assistant of the organizer to get directions to the meeting room. After about the second call received requesting the meeting room's location, the assistant usually sends out a global second email providing specific directions to all the members of the meeting. All this is time consuming and is a waste of enterprise resources.

Thus, what are needed are techniques that allow for improved meeting room integration within calendar systems.

SUMMARY

In various embodiments, techniques for visual integration of meeting space in calendar systems are presented. More specifically, and in an embodiment, a method is provided visually integrating meeting space within a calendar system. That is, an interactive map of an enterprise is presented when a meeting room is requested for a meeting. The interactive map is presented within a calendar application of an email client. An availability of the meeting room is depicted within a calendar application; the meeting room is selected by the user from the interactive map. The meeting is scheduled with the meeting room for a time slot that includes the availability of the meeting room and other attendees to the meeting.

DETAILED DESCRIPTION

As used herein a "calendar application" and "calendar system" refer to a suite of executable software services that are integrated within an email client. The phrases "calendar application" and "calendar system" can be used interchangeably and synonymously herein. An email system includes one or more email servers that communicate with a plurality of email clients. Each user of an email system accesses the email system via an email client. The calendar application or system is integrated within the email clients of the email system.

A "map" refers to a graphical or image presentation of an enterprise and its facilities, such as buildings, rooms, cubicles, meeting rooms, parking lot, floors, hallways, restrooms, stairs, elevators, recreation rooms, boiler rooms, closets, etc. In a sense, the map may be viewed as a blueprint of a single building or an entire campus of buildings. One or more maps can be linked together so as to include streets and roadways between buildings or campuses or between a particular address to a particular room within a building of an enterprise.

An "interactive map" refers to hypertext linkages that are accessible by activating locations within a map. The linkages can refer to other maps or to information, such as text, other images, other graphical elements, video, and/or audio.

According to an embodiment, the techniques presented herein are implemented in products associated and distributed by Novell®, Inc. of Provo, Utah.

Of course, the embodiments of the invention can be implemented in a variety of architectural platforms, emails systems, and/or calendar systems. Any particular architectural layout or implementation presented herein is provided for purposes of illustration and comprehension only and is not intended to limit various aspects of the invention.

It is within this initial context, that various embodiments of the invention are now presented with reference to the FIGS. 1-4.

Figure 1:
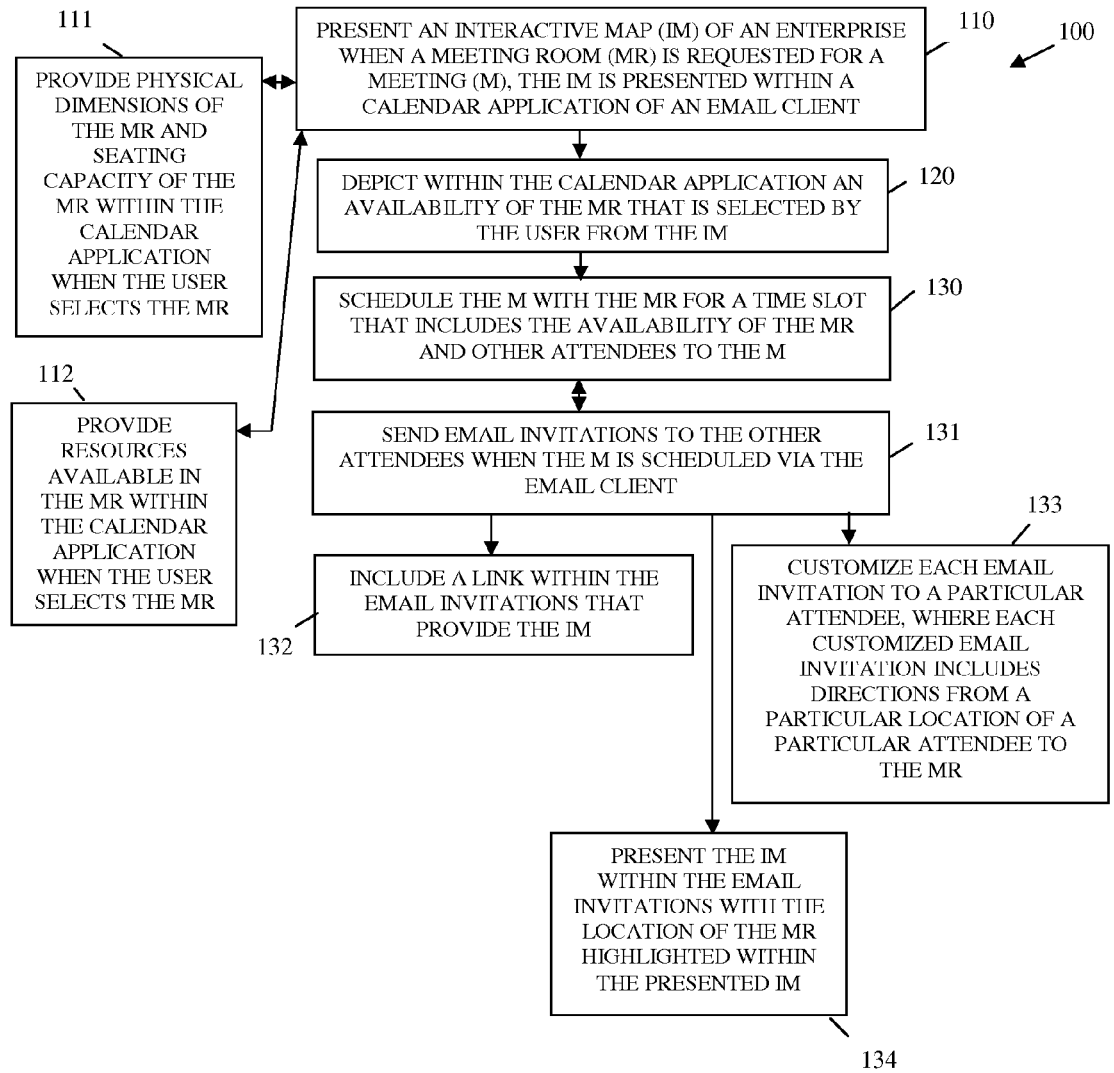
FIG. 1 is a diagram of a method is provided for visually integrating meeting space within a calendar system, according to an example embodiment.

FIG. 1 is a diagram of a method 100 is provided for visually integrating meeting space within a calendar system, according to an example embodiment. The method 100 (hereinafter "calendar service") is implemented as instructions in a machine-accessible and readable medium. The instructions when executed by a machine (processing device, computer, etc.) perform the processing depicted in FIG. 1. The calendar service is also operational over and processes within a network. The network may be wired, wireless, or a combination of wired and wireless.

The calendar service presents the perspective of processing from when a user creates a calendar entry within a calendar system for a meeting.

At 110, the calendar service presents an interactive map of an enterprise when a meeting room is requested for a meeting. The interactive map is presented within a calendar application of an email client. That is, the calendar application is integrated and processes as a subservice within the email client.

According to an embodiment, at 111, the calendar service provides physical dimensions of the meeting room and/or seating capacity for the meeting room within the calendar application when the user selects of clicks the meeting room within the interactive map. So, a user can rapidly determine whether a particular enterprise meeting room has sufficient physical dimensions and seating capacity for a group that is to be invited to the proposed meeting being created via the calendar system with the assistance of the calendar service.

In another cases, at 112, the calendar service provides resources available with the meeting room. This is done within the calendar application when the user selects the meeting room. Some resources can include but are not limited to: a whiteboard, a teleconference line, a network connection, a wireless connection, a projector, a restroom, drinks, etc. In this manner, the interactive map can provide detail information about the proposed meeting room that is being scheduled with the proposed meeting.

In some cases, the interactive map may allow a user to right click or select an option that shows a calendar and booked and available time slots for days listed in the calendar. This visually allows a user to see when the meeting room is available and not available. This is a visual presentation that is activated from the interactive map and in some cases presented as an integrated view within the interactive map.

At 120, the calendar service depicts within the calendar application an availability of the meeting room, which is selected by the user from the interactive map. That is, the user clicks on the meeting room that is depicted within the interactive map to see the availability for a desired time slot that the user wants to use for the meeting. Typically, this is not the manner that a user selects a meeting room, with most traditional calendar systems the meeting room is listed as a contact with an enterprise calendar system and users have to know the contact name to select a particular meeting room. Moreover, there is usually few if any details listed with the meeting contact that provides sufficient location and other details that would be useful to a scheduler of a meeting. These problems are solved herein because the meeting room is selected via an interactive map. Once the selection is made the traditional or underlying contact name for the meeting room can be plugged into the calendar systems, but the user does not have to know the contact name for the meeting room a priori.

At 130, the calendar service schedules the meeting with the meeting room for a time slot that includes the availability of the meeting room and other attendees to the meeting.

According to an embodiment, at 131, the calendar service sends email invitations to other attendees when the meeting is scheduled via the email client and simultaneously books the time slot for the meeting room within the calendar system.

Continuing with the embodiment of 131 and at 132, the calendar service includes a link within the email invitations that provide the interactive map. So, each email invitation to a particular attendee of the meeting includes a link to the interactive map that the attendee can activate to see a map of the facilities for an enterprise and to see visually where the meeting room is located.

Also continuing with the embodiment of 131 and at 133, the calendar service customizes each email invitation to a particular attendee. Each customized email invitation includes directions from a particular location of a particular attendee to the meeting room. Thus, each attendee can receive text directions from their location to the meeting room. For example, an attendee in a first building of a campus can receive explicit written directions for attending the meeting to a different building within the campus. In some cases, an estimated travel time to the meeting based on the attendee's location can also be provided with the email invitation. In fact, this estimated travel time can even be integrated into the user's calendar system on the user's calendar so that the user receives a notice to leave for the meeting to account for the estimated travel time to the meeting room.

Still continuing with the embodiment at 131 and at 134, the calendar service presents the interactive map within the email invitations with the location of the meeting room highlighted within the presented interactive map. The interactive map can be graphically embedded in the email invitations. In some cases, a highlighted path can be shown from each particular attendee's present location to the meeting room location within the interactive map.

Figure 2:
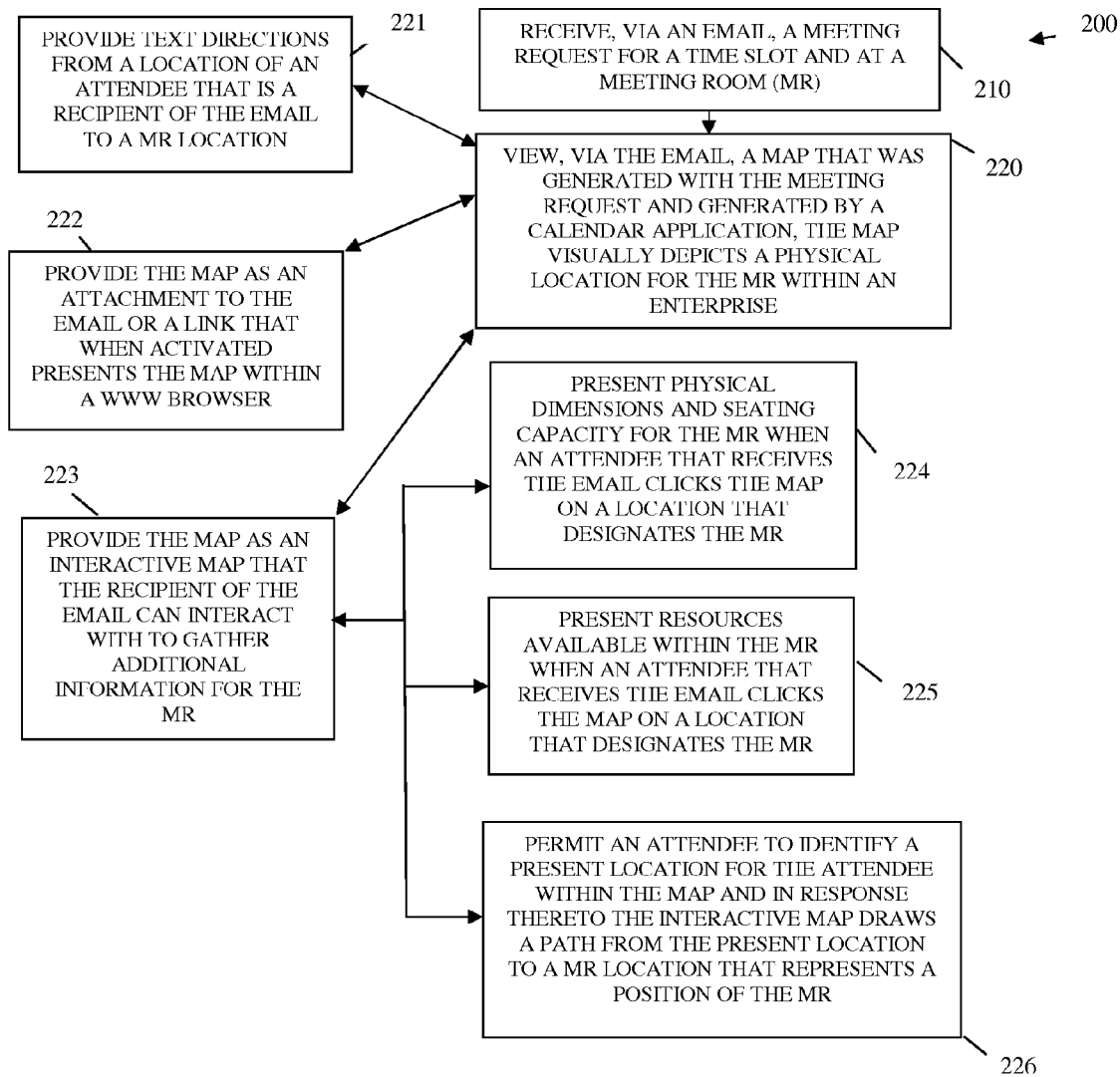
FIG. 2 is a diagram of another method is provided for visually integrating meeting space within a calendar system, according to an example embodiment.

FIG. 2 is a diagram of another method 200 is provided for visually integrating meeting space within a calendar system, according to an example embodiment. The method 200 (herein after referred to as "email service") is implemented in a machine-accessible and readable medium as instructions, which when accessed by a machine performs the processing depicted in the FIG. 2. The email service is also operational over a network; the network may be wired, wireless, or a combination of wired and wireless.

The email service represents a processing perspective from within an email system or more particularly an email client of a particular user. So, the calendar service of the method 100 from the FIG. 1 constructs a meeting invitation for a meeting that is sent to an attendee via an email and is processed by the email service, discussed herein and below with respect to the FIG. 2.

At 210, the email service receives, via an email, a meeting request for a time slot and at a particular meeting room. An attendee receives the email as a result of an invitation to a meeting that was created in the manner discussed above with reference to the method 100 of the FIG. 1.

At 220, the email service permits a map to be viewed via the email. The map was generated with the meeting request from an enhanced calendar application, such as the calendar service discussed above with reference to the method 100 of the FIG. 1. The map visually depicts a physical location for the meeting room within an enterprise. A variety of other features are also capable.

For example, at 221, the email service provides text directions from a location of an attendee that is the recipient of the email to the particular meeting room location for the meeting room.

In another case, at 222, the email service provides the map as an attachment to the email or as a link that when activated presents the map within a World-Wide Web (WWW) browser.

In yet another situation, at 223, the email service provides the map as an interactive map that the recipient (attendee) of the email can interact with to gather additional information for the meeting room.

Continuing with the embodiment of 223 and at 224, the email service presents the physical dimensions and/or seating capacity for the meeting room when the attendee that receives the email clicks the map on a location that designates the meeting room.

Also continuing with the embodiment of 223 and at 225, the email service presents resources available within the meeting room when the attendee that receives the email clicks the map on a location that designates the meeting room.

In yet continuing with the embodiment of 223 and at 226, the email service permits an attendee to identify a present location for the attendee within the map and in response thereto the interactive map draws a path from the present location to a meeting room location that represents a geographical position within an enterprise for the meeting room.

This can be done within the email or external from the email, such as when the interactive map is presented within a WWW browser.

Figure 3:
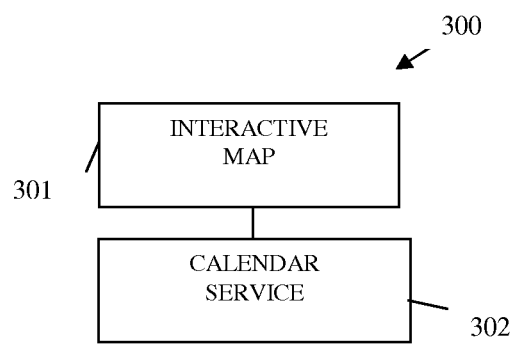
FIG. 3 is a diagram of a visual meeting space calendar system, according to an example embodiment.

FIG. 3 is a diagram of a visual meeting space calendar system 300, according to an example embodiment. The visual meeting space calendar system 300 is implemented in a machine-accessible and computer-readable storage medium as instructions, which when accessed by a machine (computer or processor-enabled device) performs, among other things, the processing depicted in the methods 100 and 200 of the FIGS. 1 and 2, respective. The visual meeting space calendar system 300 is also operational over a network; the network may be wired, wireless, or a combination of wired and wireless.

The visual meeting space calendar system 300 includes an interactive map 301 and a calendar service 302. Each of these components and their interactions with one another will now be discussed in turn.

The interactive map 301 is implemented as instructions within a computer-readable storage medium that processes on a device of the network (such as a modern computer, etc.). Example aspects of the interactive map 301 and its features were discussed in detail above with reference to the methods 100 and 200 of the FIGS. 1 and 2, respectively.

The interactive map 301 is automatically activated within a calendar application of an email client by the calendar service 302. The interactive map 301 visually depicts the meeting rooms and other rooms and physical characteristics of an enterprise.

According to an embodiment, the interactive map 301 includes links to other interactive maps for other facilities of an enterprise. So, external geographical sites can be integrated via links from the interactive map 301 to other interactive maps.

In another case, the interactive map 301 includes at least one link to a video camera that provides a real-time feed to view the particular meeting room. Much like a live webcam, a user can, via the interactive map 301, see real time footage of the meeting room being used for a particular meeting.

In a particular situation, the interactive map 301 is included within emails sent to attendees for the particular meeting. Examples of this were presented above with reference to the method 200 of the FIG. 2.

In still another situation, the interactive map 301 include links that when activated include information describing resources of each of the meeting rooms, seating capacities for each of the meeting rooms, and/or physical dimensions for each of the meeting rooms.

The calendar service 302 is also implemented as instructions within a computer-readable storage medium and processes on a device of the network. Example aspects of the calendar service 302 and its features were discussed in detail above with reference to the methods 100 and 200 of the FIGS. 1 and 2, respective.

The calendar service 302 interacts with and depicts within the interactive map 301 meeting rooms of a facility for an enterprise. The calendar service 302 also depicts within the interactive map 301 availability of the meeting rooms and locations for the meeting rooms within the facility.

A scheduler (attendee or user creating a meeting) then selects a particular meeting room for a particular meeting being scheduled by the scheduler. This is done via the calendar application by activating a link for the particular meeting room at a particular time slot depicted and accessible from the interactive map. The scheduler visually sees the meeting room and picks a time slot for the meeting via the interactive map 301.

In an embodiment, the calendar application and the calendar service 302 are integrated within an email system.

Figure 4:
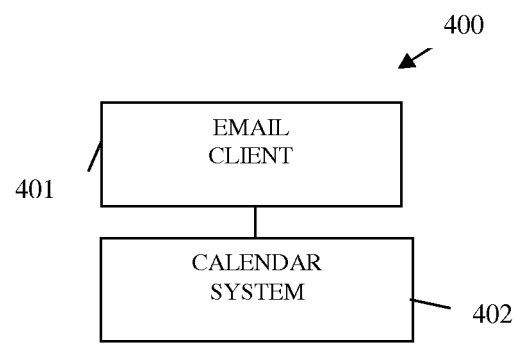
FIG. 4 is a diagram of another visual meeting space calendar system, according to an example embodiment.

FIG. 4 is a diagram of another visual meeting space calendar system 400, according to an example embodiment. The visual meeting space calendar system 400 is implemented as instructions on or within a machine-accessible and computer-readable storage medium. The instructions when executed by a machine perform, inter alia; the processing depicted with respect to the methods 100, 200 of the FIGS. 1-2, respectively, and the system 300 of the FIG. 3. The visual meeting space calendar system 400 is also operational over a network and the network may be wired, wireless, or a combination of wired and wireless.

The visual meeting space calendar system 400 is another and in some cases enhanced perspective to the visual meeting space calendar system 300 represented by the FIG. 3, presented above.

The visual meeting space calendar system 400 includes an email client 401 and a calendar system 402. Each of these will now be discussed in turn.

The email client 401 is implemented in a computer-readable storage medium and processes on a machine (computer or processor-enabled device) of the network. Example aspects of the enhanced email client 401 were presented above with respect to the methods 100 and 200 of the FIGS. 1 and 2, respectively.

The email client 401 integrates the calendar system 402 into the email client 401. So, visual calendar features are available via the calendar system 402 that is integrated into the email client 401.

The calendar system 402 is implemented in a computer-readable storage medium and also processes on a device of the network. Example aspects of the enhanced calendar system 402 were presented above in detail with reference to the FIGS. 1-3.

The calendar system 402 permits a meeting room to be located, scheduled, and viewed via a map of a facility where that meeting room is physically located. The map shows the meeting room relative to all rooms of the facility.

In an embodiment, the map is an interactive map that permits a user to view an availability of the meeting room, discover resources associated with the meeting room, schedule the meeting room to a meeting for a particular time slot, and acquire directions from a present location to the meeting room.

In another case, the map is included with emails sent to attendees of a particular meeting that is scheduled via the calendar system 402 for the meeting room.

In still another situation, the emails include directions from locations of each of the attendees to a meeting room location for the meeting room and paths for the directions are highlighted within the map.

According to an embodiment, the calendar system 402 also includes a search facility/service/mechanism that a user to search for a particular meeting room that has user-defined criteria. The search criteria include such things as user-defined: meeting room seating capacity and/or meeting room equipment or resources available and desired by the user. The search results displayed by the calendar system 402 can assist the user in locating the closest meeting rooms meeting the user-defined search criteria within the map, such that by activating a highlighted link within the map the user can visually see the meeting room. In another case, the links can be presented in a text window that when activated takes the user to the map location for the desired meeting room and/or presents images of the meeting room.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented within a non-transitory computer-readable storage medium as executable instructions executed by a computer, the method, comprising:
   receiving, by a computer an email having a meeting request for a time slot and at a meeting room;
   generating, by a calendar application integrated and processing as a subservice within an email client that executes on the computer, a map representing a physical location for the meeting room within a building, and including within the map hypertext linkages for the physical location and other locations within the building and when the hypertext linkages are activated causing by the calendar application to present on the computer the map as an interactive map depicting other maps, text, images, graphical elements, video and audio; and
   presenting, on the computer and within the email the interactive map for interaction and manipulation by a recipient of the email.

2. The method of claim 1, wherein presenting further includes providing text directions from a location of an attendee that is the recipient of the email to a meeting room location.

3. The method of claim 1, wherein presenting further includes providing the interactive map as an attachment to the email or a link that when activated presents the interactive map within a World-Wide Web (WWW) browser.

4. The method of claim 1, wherein presenting further includes providing the interactive map for the recipient of the email to interact with to gather additional information for the meeting room.

5. The method of claim 4, wherein providing further includes presenting physical dimensions and seating capacity for the meeting room when the recipient clicks the interactive map on the physical location that designates the meeting room.

6. The method of claim 4, wherein providing further includes presenting resources available within the meeting room when the recipient an clicks the interactive map on the physical location that designates the meeting room.

7. The method of claim 4, wherein providing further includes permitting the recipient to identify a present location for the attendee within the interactive map and in response thereto the interactive map draws a path from the present location to a meeting room location that represents the physical location of the meeting room.

8. The method of claim 7, wherein permitting further includes providing the interactive map within a body of the email.

9. The method of claim 7, wherein permitting further includes providing the interactive map within a browser application when selected within the email.

10. The method of claim 1, wherein receiving further includes obtaining the email as a result of an invitation being sent for the meeting at the meeting room.

11. A method implemented within a non-transitory computer-readable medium as executable instructions executed by a computer, the method, comprising:
    obtaining, by the computer, an email having a request for a meeting at a meeting room, the email having an embedded interactive map;
    activating, by the computer, the interactive map when selected within the email, and presenting the interactive map on the computer providing details relevant to an attendee of the meeting and the meeting room; and
    responding, by the computer, to activations of hypertext linkages embedded in the interactive map by a calendar application processed as a subservice of an email client that executes on the computer, the attendee making the activations of the hypertext links when interacting with the interactive map within the email and the hypertext links causing presentations of a blueprint of a building where the meeting room is located and other locations within the building that the computer presents based on the activations as: other maps, text, images, graphical elements, video, and audio.

12. The method of claim 11, wherein obtaining further includes additionally providing the interactive map as the blueprint for a campus of buildings, wherein one of the buildings of the campus is the building where the meeting room is located.

13. The method of claim 12, wherein obtaining further includes providing the interactive map as a linked map to other maps that include streets and roadways between the buildings of the campus.

14. A system, comprising,
    an email server configured with executable instructions residing in a non-transitory computer-readable storage medium, the executable instructions executed by one or more processors of the email server and the executable instructions representing at least a portion of an email system; and
    an email client residing in a non-transitory computer-readable as executable instructions that execute on a computer, and the email client represent another portion of the email system,
    wherein the email client is adapted and configured to: i) execute on a processor of the computer, ii) receive an invitation to a meeting at a designated meeting room within an email, and ii) generate, present, and provide an interactive map relevant to an attendee of the meeting and the meeting room within the email, wherein the interactive map comprising hypertext linkages representing a blueprint of a building where the meeting room is located and other locations within the building that when selectively activated by the attendee interacting with the interactive map within the email cause the email client to present on the computer other maps, text, images, graphical elements, video, and audio.

15. The system of claim 14, wherein the interactive map is configured and adapted to be responsive to selections from the attendee to present information for navigating from an attendee location to a meeting room location.

16. The system of claim 14, wherein the interactive map is configured and adapted to be responsive to selections from the attendee to present information for navigating from a building location for a building where the attendee is located to a different building location for the building where the meeting room is located.

17. The system of claim 14, wherein the interactive map is configured and adapted to be responsive to selections from the attendee to present information relevant to resources available within the meeting room for the meeting.

\* \* \* \* \*